United States Patent [19]

Lauer

[11] 4,339,027
[45] Jul. 13, 1982

[54] APPARATUS FOR ORIENTING HALVED FRUIT CUT SIDE DOWN

[76] Inventor: George E. Lauer, 6250 Melville Dr., Oakland, Calif. 94611

[21] Appl. No.: 205,454

[22] Filed: Nov. 10, 1980

[51] Int. Cl.³ .......................................... B65G 47/24
[52] U.S. Cl. .................................. 198/383; 99/549; 198/399; 198/400; 198/771
[58] Field of Search .............. 178/383, 390, 399, 402, 178/400, 409, 410, 771; 99/549, 550; 221/171, 172

[56] References Cited

U.S. PATENT DOCUMENTS

| | | | |
|---|---|---|---|
| 2,337,394 | 12/1943 | Kok | 198/399 |
| 2,832,459 | 4/1958 | Lauer | 198/399 |
| 3,123,199 | 3/1964 | Easterday et al. | 198/383 |
| 3,598,223 | 8/1971 | Lauer | 198/399 |
| 4,105,108 | 8/1978 | Lauer | 198/399 X |

Primary Examiner—Bruce H. Stoner, Jr.
Assistant Examiner—Douglas D. Watts
Attorney, Agent, or Firm—Harris Zimmerman; Howard Cohen

[57] ABSTRACT

An apparatus for orienting halved fruit with the cut sides thereof facing downwardly includes a longitudinally extending vibrating table which is inclined slightly downwardly from the receiving end to the discharge end. The table is provided with longitudinally extending opposed side walls, with a bottom extending therebetween to define a channel along which the fruit translates. In the first receiving section of the apparatus, the bottom is inclined laterally toward one side as well as longitudinally. In the second section, contiguous with the first, a channel is formed in the one side wall to engage the upwardly facing cut faces of the fruit. In a third section, a trough narrower than the width of the fruit is formed in the bottom wall generally adjacent to the lower edge of the one side, the channel of the second section directing the fruit into the trough. The trough widens and deepens with increasing distance along the vibrating table, forming a V shaped trough which is bilaterally symmetrical. The lower end of the table includes a rectangular trough portion having a substantially flat bottom. A central spine protrudes upwardly along the midline of the rectangular trough portion to engage the longitudinal groove in the fruit formed by the coring operation. The rectangular trough portion includes laterally inclined surfaces spaced on alternate sides therealong to cause the fruit to traverse the midline and engage the spine.

6 Claims, 11 Drawing Figures

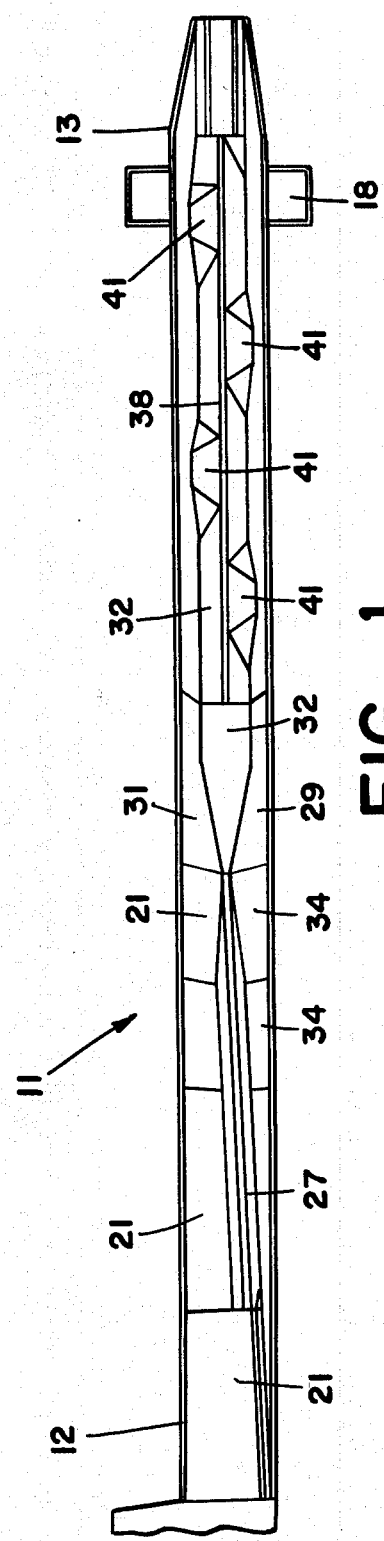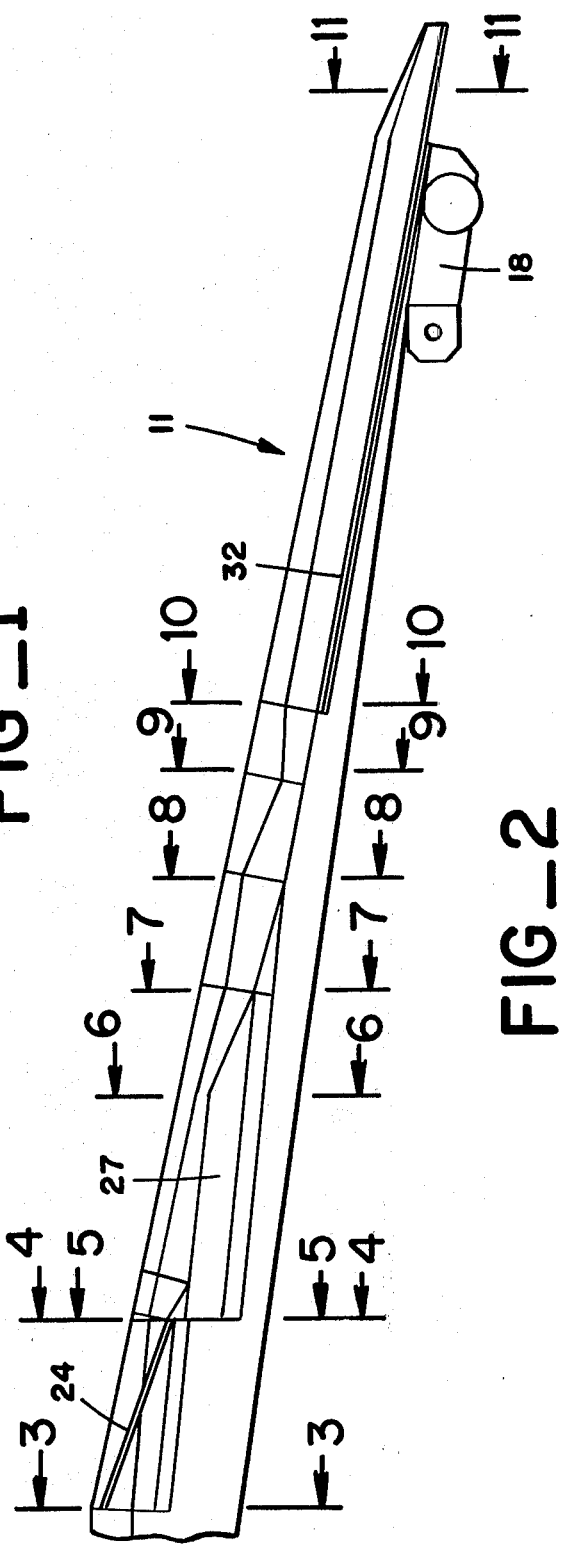

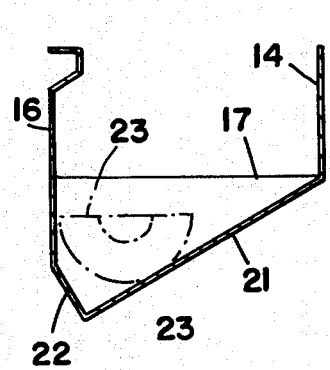 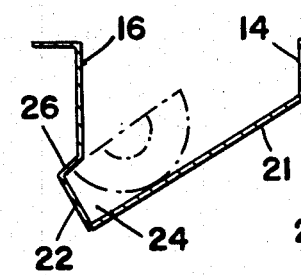 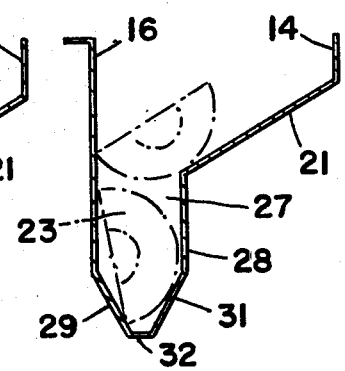
FIG_3    FIG_4    FIG_5
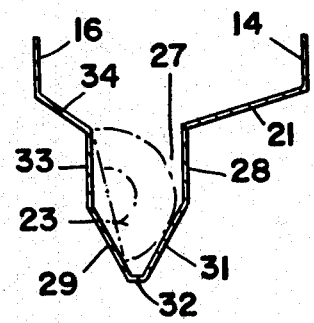 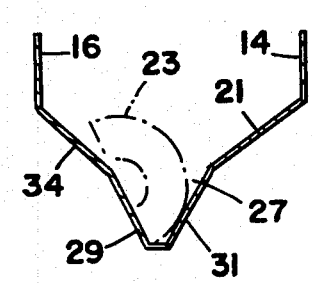 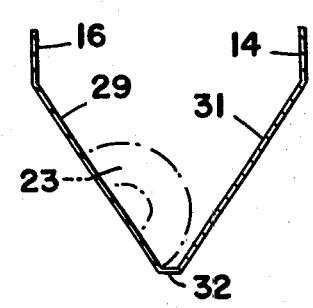
FIG_6    FIG_7    FIG_8
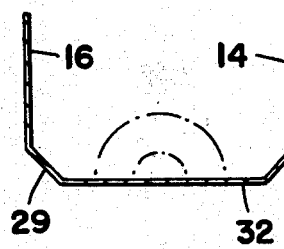 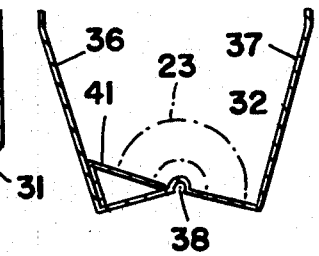 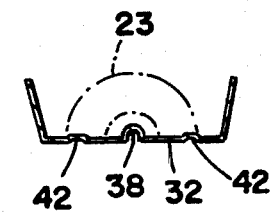
FIG_9    FIG_10    FIG_11

APPARATUS FOR ORIENTING HALVED FRUIT CUT SIDE DOWN

BACKGROUND OF THE INVENTION

The following U.S. patents comprise the prior art most closely related to the present invention: U.S. Pat. Nos. 2,337,394; 2,832,459; and 3,598,223.

In the processing and packing of fresh fruit such as pears, peaches, apricots, and the like, it is common practice to employ machines which peel the fruit, cut the fruit longitudinally in half, and remove the core and/or pit. It is then often necessary to grade the halved fruit pieces according to size, a task often performed by electronic measuring apparatus. Alternatively, the fruit halves may be fed into a slicing machine which cuts the fruit pieces into longitudinal slices.

Whether the cored fruit halves are fed through a grading machine or a slicing machine, they first must be oriented cut face down, with their longitudinal axes colinear with the direction of travel into the slicing machine or grading machine. To accomplish this orientation task, there are several devices known in the prior art. These devices generally include shaker tables along which the fruit pieces travel, the tables including irregular surface features which manipulate the passing fruit pieces to orient them properly.

The prior art apparatus has generally included shaker tables with longitudinally extending channels along which the fruit pieces travel, with lateral guides and other surface features to direct the fruit pieces into channels or recesses in which the fruit pieces may fit only when oriented properly. These devices have been generally successful because they avoid bruising or abrading the fruit pieces, while being relatively successful in orienting the fruit pieces as desired.

Operational experience with the prior art devices has revealed several drawbacks, however. One notable problem has been that the fruit pieces occasionally do not align themselves longitudinally as desired. For example, a statistically significant proportion of pears have lengths similar to their widths, so that they cannot be manipulated according to their external shape into the proper longitudinal alignment. Furthermore, the prior art fruit orienting devices have permitted too many opportunities for the fruit to become lodged in grooves or jammed together by lateral guides. In these instances, the output of the orientation device is interrupted while the jam is cleared manually, resulting in a momentary loss of productivity of the down-stream fruit processing equipment. If these interruptions in the output of the fruit orienting devices occur too frequently, the sum total of these momentary losses in productivity of the entire packing operation can become a significant economic factor.

SUMMARY OF THE PRESENT INVENTION

The present invention generally comprises an apparatus for orienting halved fruit pieces with their cut sides facing downwardly. Further, the present invention orients the halved fruit pieces so that the longitudinal axes thereof are coincident with the direction of translation of the pieces in the apparatus. The most salient advantage of the present invention is the positive means it employs for urging the cut surfaces of the fruit pieces into a downwardly facing orientation. The apparatus of the present invention also is designed to provide no impediment to a constant flow of properly oriented fruit pieces.

The apparatus of the present invention generally comprises a shaker table which is provided with a receiving end and a discharge end, the table being inclined downwardly from the former to the latter. The shaker table is provided with a longitudinally extending channel along which the halved fruit pieces translate, and is also provided with reciprocating, vibrating means for providing translational energy to the fruit pieces.

The channel along which the fruit pieces translate includes a pair of spaced side walls and a bottom panel extending therebetween. In the receiving portion of the channel, the bottom panel is inclined laterally from one side wall downwardly toward the other side wall, as well as downwardly toward the discharge end. The fruit pieces are thus caused to translate and slide toward the other side wall. In a second portion of the shaker table, a side channel extends concavely and laterally into the other side wall, and is provided to engage an edge portion of each fruit piece. In the next portion of the shaker table, a trough is formed in the bottom panel, with one side wall of the trough being generally coextensive with the other side wall. The fruit pieces engaged by the side channel are urged by the side channel downwardly into the trough, thus preventing fruit pieces from traversing over the trough and avoiding further manipulation. The trough includes deep, spaced parallel side walls, and a V-shaped bottom. The spacing between the side walls is substantially less than with width of the halved fruit pieces being processed, so that the fruit pieces must traverse the trough with the cut faces of the pieces extending obliquely upwardly and impinging upon one of the sides of the V-shaped bottom.

In the next portion of the table, the sides of the V bottom flare laterally as they extend down the shaker table, so that the channel along which the fruit pieces translate becomes a V-shaped trough which extends the entire width of the table. The fruit pieces traverse this portion of the table with the cut faces thereof impinging on and sliding along one of the walls of the V-shaped channels. The following portion of the table comprises a generally rectangular trough having a planar orthogonal bottom. As the fruit pieces traverse from the V-shaped portion to the rectangular portion, they continue to slide along the trough on the cut faces thereof. Thus the fruit pieces have become oriented with their cut surfaces facing downwardly.

The discharge portion of the table includes a planar bottom panel with a rounded spine protruding upwardly and extending along the mid-line of the discharge portion. In succeeding sections the bottom panel includes ramps which are inclined alternately toward one side wall and then toward the other, so that the fruit pieces are caused to traverse laterally the discharge portion of the channel. In so doing, they are caused to traverse the spine. The spine engages the core channel resulting from a previous coring operation on the fruit, so that the fruit becomes aligned with the core channel thereof engaging the spine of the trough. Thus the fruit pieces are delivered from the device in the cut face down, longitudinally aligned disposition which is required by further packing or slicing equipment.

BRIEF DESCRIPTION OF THE DRAWING

FIG. 1 is a plan view of the apparatus for orienting fruit pieces of the present invention.

FIG. 2 is a side elevation of the fruit orienting apparatus of the present invention.

FIG. 3 is a cross-sectional elevation of the invention, taken along line 3—3 of FIG. 2.

FIG. 4 is a cross-sectional elevation of the invention, taken along line 4—4 of FIG. 2.

FIG. 5 is a cross-sectional elevation of the invention, taken along line 5—5 of FIG. 2.

FIG. 6 is a cross-sectional elevation of the invention, taken along line 6—6 of FIG. 2.

FIG. 7 is a cross-sectional elevation of the invention, taken along line 7—7 of FIG. 2.

FIG. 8 is a cross-sectional elevation of the invention, taken along line 8—8 of FIG. 2.

FIG. 9 is a cross-sectional elevation of the invention, taken along line 9—9 of FIG. 2.

FIG. 10 is a cross-sectional elevation of the invention, taken along line 10—10 of FIG. 2.

FIG. 11 is a cross-sectional elevation of the invention, taken along line 11—11 of FIG. 2.

DESCRIPTION OF THE PREFERRED EMBODIMENT

The present invention is generally characterized as an apparatus for manipulating halved fruit pieces into a disposition such that their cut sides are facing downwardly, and their longitudinal axes are aligned co-linearly with a predetermined common axis. As shown in FIGS. 1 and 2 of the accompanying drawings, the apparatus of the present invention includes a shaker table 11, which is provided with a receiving end 12 and a discharge end 13. The shaker table 11 is inclined downwardly from the receiving end to the discharge end. A vibrating mechanism 18 is secured to the lower end of the shaker table to provide reciprocal vibratory motion to the table. The vibrating motion of the table, together with its downward slope toward the discharge end, causes halved fruit pieces to translate down the table toward the discharge end.

The shaker table 11 is provided with a longitudinally extending channel thereon along which the halved fruit pieces translate. The channel is provided with irregular surface features which are of such a nature as to orient all halved fruit pieces passing thereover into the cut face down position. The upper or receiving end 12 of the shaker table includes a pair of spaced parallel side walls 14 and 16, as shown in FIG. 3. Extending between the side walls 14 and 16 is a bottom wall 17, which is inclined longitudinally downwardly toward the discharge end 13. Directly adjacent to the receiving portion 12, a bottom wall 21 is provided, and is inclined laterally from the side wall 14 downwardly toward the side wall 16, as well as downwardly toward the discharge end. An oblique panel 22 joins the distal end of the bottom 21 with the lower end of the side wall 16. It may be appreciated that as a cut fruit piece (represented in phantom line) 23 drops onto the inclined bottom wall 21, it will translate and slide laterally to impinge upon the side wall 16.

In the next portion of the shaker table, shown in FIG. 4, a channel 24 is disposed in concave fashion in the side wall 16 and extends therealong. The channel 24 is defined by the inclined bottom panel 21, which increases in width with increasing distance down the shaker table, the short oblique panel 22, and another oblique panel 26 extending inwardly from the side wall 16 and disposed substantially parallel to the bottom panel 21. The channel 24 is provided to engage an edge portion of a fruit piece 23 which is proceeding along the shaker table with the cut surface of the fruit piece facing upwardly. The cut face of the fruit piece is caused by its engagement with the channel 24 to incline from its generally horizontal disposition in the section shown in FIG. 3 and described previously.

In the succeeding section of the device, shown in FIG. 5, a trough 27 is formed in the bottom wall 21 adjacent to the side wall 16. One side wall of the trough 27 is continuous with the side wall 16, the other side wall 28 extending generally parallel to the side wall 16 and spaced apart therefrom. The bottom of the trough 30 is provided with a generally V-shaped configuration, the V being defined by obliquely related converging walls 29 and 31. A short bottom panel 32 joins the adjacent lower edges of the V walls 29 and 31.

It should be noted that the width of the trough 37, as defined by the spacing of the walls 16 and 28, is much less than the width of the halved fruit pieces 23 which are to be oriented by the apparatus. As the halved fruit pieces 23 arrive at the trough 27 in the cut face up disposition, they are urged by their engagement in the channel 24 to fall edgewise into the trough 27, as shown in FIG. 5. Due to the fact that the trough 27 is narrower than the width of the fruit pieces, the fruit pieces are caused to maintain their edge supported disposition in which the cut faces extend upwardly and close to vertically. It may be appreciated that fruit pieces approaching the trough 27 in the cut face down disposition will also fall into the trough 27 edgewise, although the cut faces of these latter fruit pieces will be disposed adjacent to the walls 28 and 31, rather than adjacent to the walls 16 and 29.

In the following section of the apparatus, shown in FIG. 6, the trough 27 continues to extend along the bottom of the orientation apparatus. However, the trough angles laterally toward the midline of the shaker table and away from the side wall 16. A side wall 33 extends upwardly from the V wall 29, and is disposed generally parallel and spaced apart from the other side wall 28. An inclined bottom wall 34 extends downwardly from the lower edge of the side wall 16 to the upper edge of the trough wall 33. The trough 27 is substantially the same as in the previous section (FIG. 5), so that the fruit pieces 23 remain in substantially the same disposition as described previously.

The portion shown in FIG. 7 is slightly downstream from the section shown in FIG. 6, and it depicts the trough 27 centered at the midline of the apparatus. The trough side walls 28 and 33 are tapered in depth with increasing distance down the shaker table, so that the bottom walls 21 and 34 of the channel intersect the walls 31 and 29 of the V section. The fruit pieces 23 are in the edgewise disposition of FIGS. 5 and 6, although the trough side walls 28 and 33 are no longer present to support the upper edge of the fruit pieces. As a result, the fruit pieces 23 tilt slightly downwardly from their edgewise disposition, so that the planar cut face of each fruit piece impinges upon and translates along one of the V side walls 29 or 31.

With reference to FIG. 8, in the next portion of the channel, the V side walls 29 and 31 flare outwardly to include a larger angle therebetween. At the same time, the inclined bottom walls 21 and 34 taper to vanishing points, so that the upper edges of the V walls 29 and 31 intersect the lower edges of the side walls 14 and 16. The fruit pieces 23 continue to slide along the V shaped trough with the planar cut faces thereof impinging on and translating along one of the side walls 29 or 31 thereof.

In the following section of the apparatus, as shown in FIG. 9, the narrow bottom wall 32 which joins the lower edges of the V walls 29 and 31, broadens to become a planar bottom wall which extends substantially the entire width of the channel. The V walls 29 and 31 taper substantially to the configuration shown in FIG. 9 in which they connect the lower edges of the side walls 14 and 16 with the planar bottom wall 32. As the V walls 29 and 31 taper with increasing distance down the shaker table, the fruit pieces 23 are no longer supported by the V walls and are caused to flop onto their cut faces, as shown in FIG. 9. As a result, the fruit pieces become oriented with their planar cut surfaces facing downwardly.

The next portion of the apparatus, shown in section in FIG. 10, comprises a deep sided channel having obliquely opposed sides 36 and 37 extending upwardly from the bottom. A rounded spine 38 protrudes upwardly and extends along the midline of the trough. The bottom 32 angles laterally downwardly from the spine 38 toward the side walls 36 and 37, as shown in FIG. 10. A plurality of ramps 41 are disposed along this trough portion, as shown in FIG. 1, with each ramp 41 being inclined downwardly from the side wall toward the central spine 38. The ramps 41 are disposed alternately on opposed sides of the spine 38, so that the fruit pieces are caused to translate laterally from one side of the trough to the other as they traverse this portion of the trough. As the pieces 23 traverse laterally, they are caused to intersect the spine 38. The repeated intersections with the spine 38 facilitate the spine 38 engaging the cored channels of the fruit pieces. This engagement assures that the fruit pieces are aligned colinearly along the same longitudinal axis coincident with the extent of the spine 38. Thus the fruit pieces are not only in the desired cut face down disposition, they are aligned longitudinally and optimally for further processing equipment.

In the final discharge section of the apparatus, shown in FIG. 11, the flat bottom 32 of the apparatus is provided with a pair of raised rails 42 which extend slightly above the plane of the bottom 32 and are equally spaced on opposite sides of the spine 38. The rails 42 cause the cut faces of the fruit pieces 23 to ride above the planar surface of the bottom 32. Any suction effect or surface tension effect which would cause the cut faces of the fruit pieces to adhere to the bottom 32 are thus negated, so that the fruit pieces may be discharged from the apparatus without any adhesion thereto.

I claim:

1. Apparatus for orienting halved, cored fruit pieces cut faces down and aligned along a common longitudinal axis, comprising a longitudinally extending table having a receiving end elevated above a discharge end; means for defining at least one longitudinal channel on said table along which said fruit pieces translate, said means including a first side wall extending along the receiving portion of said channel; a bottom panel inclined laterally downwardly to intersect with said first wall; a second portion of said longitudinal channel coextensive with said receiving portion including a side channel disposed in concave fashion in said first side wall and extending therealong, said side channel adapted to engage an edge portion of each of said fruit pieces as they translate thereby; a third portion of said longitudinal channel contiguous with said second portion and including a trough formed in a portion of said bottom panel, said side channel urging said engaged edge portions of said fruit pieces downwardly into said trough, said trough including generally planar, opposed sides and a V-shaped bottom, said opposed sides being spaced apart substantially less than the nominal width of said fruit pieces; a fourth portion of said longitudinal channel contiguous with said third portion and including a V-shaped bottom having walls extending the width of said longitudinal channel on which said cut faces of said fruit pieces impinge and slide; a fifth portion of said longitudinal channel contiguous with said fourth portion and including a planar, laterally extending bottom on which said cut faces land; and means for aligning said fruit pieces longitudinally.

2. The apparatus of claim 1, wherein said last mentioned means includes a sixth portion of said longitudinal channel contiguous with said fifth portion and including a rounded spine projecting upwardly and extending along the midline of said channel to engage the cored portions of said fruit pieces.

3. The apparatus of claim 2, further including a plurality of laterally inclined ramp members disposed alternately on opposed sides of said spine and inclined thereto.

4. The apparatus of claim 2, wherein said discharge portion includes a pair of raised tracks extending adjacent to opposed sides of said spine.

5. The apparatus of claim 1, wherein said side channel is defined by said laterally inclined bottom wall and an upper wall extending from the lower edge of said one side wall and disposed parallel to said bottom wall.

6. The apparatus of claim 1, wherein said trough veers laterally from said one side wall toward the midline of said longitudinal channel.

* * * * *